US 6,733,077 B2

(12) United States Patent
Asano (10) Patent No.: US 6,733,077 B2
(45) Date of Patent: May 11, 2004

(54) RECLINING MECHANISM FOR VEHICLE SEAT (75) Inventor: Makoto Asano, Toyota (JP)

(73) Assignee: Araco Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/385,612

(22) Filed: Mar. 12, 2003

(65) Prior Publication Data
US 2003/0155800 A1 Aug. 21, 2003

Related U.S. Application Data (60) Continuation of application No. 10/092,727, filed on Mar. 8, 2002, now abandoned, which is a division of application No. 09/337,126, filed on Jun. 21, 1999, now Pat. No. 6,390,557.

(30) Foreign Application Priority Data

Jun. 22, 1998 (JP) .......................................... 10-175068
Mar. 25, 1999 (JP) ............................................ 11-81926

(51) Int. Cl.⁷ ................................................ B60N 2/42
(52) U.S. Cl. ...................................... 297/367; 297/369
(58) Field of Search ................................ 297/367, 369, 297/378.12, 368

(56) References Cited

U.S. PATENT DOCUMENTS

| 4,103,970 A | * | 8/1978 | Homier ....................... 297/363 |
| 4,997,223 A | * | 3/1991 | Croft ........................... 297/367 |
| 5,622,407 A | * | 4/1997 | Yamada et al. .............. 297/366 |
| 5,632,525 A | | 5/1997 | Uramichi |
| 5,762,400 A | * | 6/1998 | Okazaki et al. .............. 297/367 |
| 5,984,413 A | * | 11/1999 | Baloche et al. ............. 297/367 |
| 6,328,382 B1 | * | 12/2001 | Yamashita ................... 297/367 |

FOREIGN PATENT DOCUMENTS

| EP | 0 773 132 A2 | 11/1996 |
| EP | 0 773 133 A2 | 11/1996 |
| EP | 0 913 293 A1 | 10/1998 |
| GB | 1193971 | 9/1967 |
| JP | 56-52010 | 8/1980 |
| JP | 7-136032 | 11/1993 |
| JP | 8-52040 | 8/1994 |
| JP | 09234132 A | 6/1996 |

* cited by examiner

Primary Examiner—Anthony D. Barfield
(74) Attorney, Agent, or Firm—Reed Smith LLP; Stanley P. Fisher, Esq.; Juan Carlos A. Marquez, Esq.

(57) ABSTRACT

A reclining mechanism for a vehicle seat composed of first arm member attached to a frame structure of a seat cushion or a back rest; a second arm member attached to a frame structure of the other of the back rest or the seat cushion, the second arm member connected with the first arm member via a hinge pin for relative rotation about the hinge pin and having a pair of diametrically opposed semi-circular ratchet portions concentric with the hinge pin; a pair of diametrically opposed slide pawls slidably coupled with the first arm member in a radial direction with respect to the hinge pin to be moved toward and away from the ratchet portions; and a cam element slidably coupled with the first arm member in a lateral direction perpendicular to the slide pawls and disposed therebetween.

23 Claims, 12 Drawing Sheets

RECLINING MECHANISM FOR VEHICLE SEAT

This application is a continuation application of U.S. application Ser. No. 10/092,727 filed on Mar. 8, 2002 now abandoned of a divisional application of U.S. application Ser. No. 09/337,126 filed on Jun. 21, 1999 now U.S. Pat. No. 6,390,557.

BACKGROUND OF THE INVENTION

1. Field of the Invention

The present invention relates to a reclining mechanism for a vehicle seat for adjusting an inclined angle of a back rest of the seat relative to a seat cushion.

2. Description of the Prior Art

Disclosed in Japanese Patent Laid-open Publication No. 8-52040 is a reclining mechanism for a vehicle seat which is composed of a pair of arm members for attachment to a frame structure of a seat cushion and to a frame structure of a back rest, the arm members being connected by means of a hinge pin for relative rotation about the hinge pin, a slide pawl slidably coupled with one of the arm members to be moved in a radial direction with respect to the hinge pin, and a cam element mounted on the hinge pin for rotation therewith and engaged with the slide pawl for maintaining the slide pawl in engagement with a ratchet portion of the other of the arm members and for disengaging the slide pawl from the ratchet portion when it is rotated with the hinge pin. In the reclining mechanism, the relative rotation of the arm members is restricted by engagement of the slide pawl with the ratchet portion to lock the back rest at an inclined angle and is permitted by disengagement of the slide pawl from the ratchet portion for adjustment of the inclined angle of the back rest.

In the reclining mechanism, the engagement of the slide pawl with the ratchet portion of the arm member is maintained in a condition where the slide pawl is pressed by engagement with a portion of the cam element. When the cam element is rotated with the hinge pin to disengage the slide pawl from the ratchet portion of the arm member, the slide pawl is retracted by engagement with a portion of the cam element. If the reclining mechanism is applied with a load, the slide pawl is slightly rotated due to an error in assembly of the component parts of the reclining mechanism. This results in looseness in engagement of the slide pawl with the ratchet portion of the arm member.

SUMMARY OF THE INVENTION

It is therefore a primary object of the present invention to provide a reclining mechanism for a vehicle seat wherein rotation of the slide pawl is prevented to firmly maintain the engagement of the slide pawl with the ratchet portion even if the reclining mechanism is applied with a load.

According to the present invention, the object is accomplished by providing a reclining mechanism for a vehicle seat, which comprises a first arm member for attachment to a frame structure of a seat cushion or a back rest of the vehicle seat, a second arm member for attachment to a frame structure of the other of the back rest or the seat cushion, the second arm member being connected with the first arm member by means of a hinge pin for relative rotation about the hinge pin and having a semicircular ratchet portion concentric with the hinge pin, a slide pawl slidably coupled with the first arm member in a radial direction with respect to the hinge pin to be moved toward and away from the ratchet portion of the second arm member, and a cam element slidably coupled with the first arm member in a lateral direction perpendicular to the slide pawl and operatively connected with the hinge pin to be-moved by rotation of the hinge pin in the lateral direction for engaging the slide pawl with the ratchet portion of the first arm member and for disengaging the slide pawl from the ratchet portion of the first arm member, wherein the hinge pin is loaded by a torsion spring assembled thereon to bias the cam element in the lateral direction for maintaining the slide pawl in engagement with the ratchet portion of the second arm member, wherein the slide pawl is formed at its outer end with a semi-circular toothed portion to be engaged with the ratchet portion of the first arm member and its inner end with a pair of laterally spaced projections for engagement with a flat end surface of the cam element, and wherein the cam element is formed at the flat end surface thereof with a pair of laterally spaced recesses to be engaged with the spaced projections of the slide pawl for permitting disengagement of the slide pawl from the ratchet portion of the first arm member.

In a practical embodiment of the present invention, the first arm member is formed with a first guide groove in a radial direction with respect to the hinge pin and a second guide groove perpendicular to the first guide groove, and the slide pawl is slidably coupled within the first guide groove while the cam element is slidably coupled within the second guide groove. For operative connection of the cam element with the hinge pin, the cam element is formed with an elongated lateral hole in the lateral direction perpendicular to the slide pawl, and the hinge pin is inserted across the-lateral hole of the cam element for connection to the first and second arm members and being engaged with a portion of the lateral hole of the cam element.

According to an aspect of the present invention, there is provided a reclining mechanism for a vehicle seat, which comprises a first arm member for attachment to a frame structure of a seat cushion or a back rest of the vehicle seat, a second arm member for attachment to a frame structure of the other of the back rest or the seat cushion, the second arm member being connected with the first arm member by means of a hinge pin for relative rotation about the hinge pin and having a pair of diametrically opposed semi-circular ratchet portions concentric with the hinge pin, a pair of diametrically opposed slide pawls slidably coupled with the first arm member in a radial direction with respect to the hinge pin to be moved toward and away from the ratchet portions of the second arm member, and a cam element slidably coupled with the first arm member in a lateral direction perpendicular to the slide pawls and disposed between the slide pawls, the cam element being operatively connected with the hinge pin to be moved by rotation of the hinge pin in the lateral direction for engaging the slide pawls with the ratchet portions of the second arm member and for disengaging the slide pawls from the ratchet portions of the second arm member, wherein the hinge pin is loaded by a torsion spring assembled thereon to bias the cam element in the lateral direction for maintaining the slide pawls in engagement with the ratchet portions of the second arm member.

In a practical embodiment of the reclining mechanism described above, the slide pawls each are formed at their outer ends with a semi-circular toothed portion for engagement with each ratchet portion of the second arm members and at their inner ends with a pair of laterally spaced projections to be engaged with opposite flat surfaces of the cam element for maintaining the slide pawls in engagement with the ratchet portions of the second arm member, and wherein the cam element is formed with the opposite flat surfaces thereof with a pair of laterally spaced recesses to be engaged with the spaced projections of the slide pawls for permitting disengagement of the slide pawls from the ratchet portions of the second arm member.

In such an embodiment described above, it is preferable that a cam plate is assembled with the cam element to disengage the slide pawls from the ratchet portions of the second arm member by engagement therewith when the hinge pin is rotated against the load of the torsion spring to cause lateral movement of the cam element. The cam plate is formed with a pair of diametrically opposed cam slots which are engaged with a pair of cam pins provided on the slide pawls to disengage the slide pawls from the ratchet portions of the second arm member when the hinge pin is rotated against the load of the torsion spring to cause lateral movement of the cam element. In the embodiment, a movable cam plate may be assembled with the hinge pin to be rotated with the hinge pin and rotatably connected with the cam element to cause lateral movement of the cam element when rotated with the hinge pin, wherein the movable cam plate is formed with a pair of diametrically opposed cam slots which are engaged with a pair of cam pins provided on the slide pawls to disengage the slide pawls from the ratchet portions of the second arm member when the hinge pin is rotated against the load of the torsion spring.

BRIEF DESCRIPTION OF THE DRAWINGS

Other objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
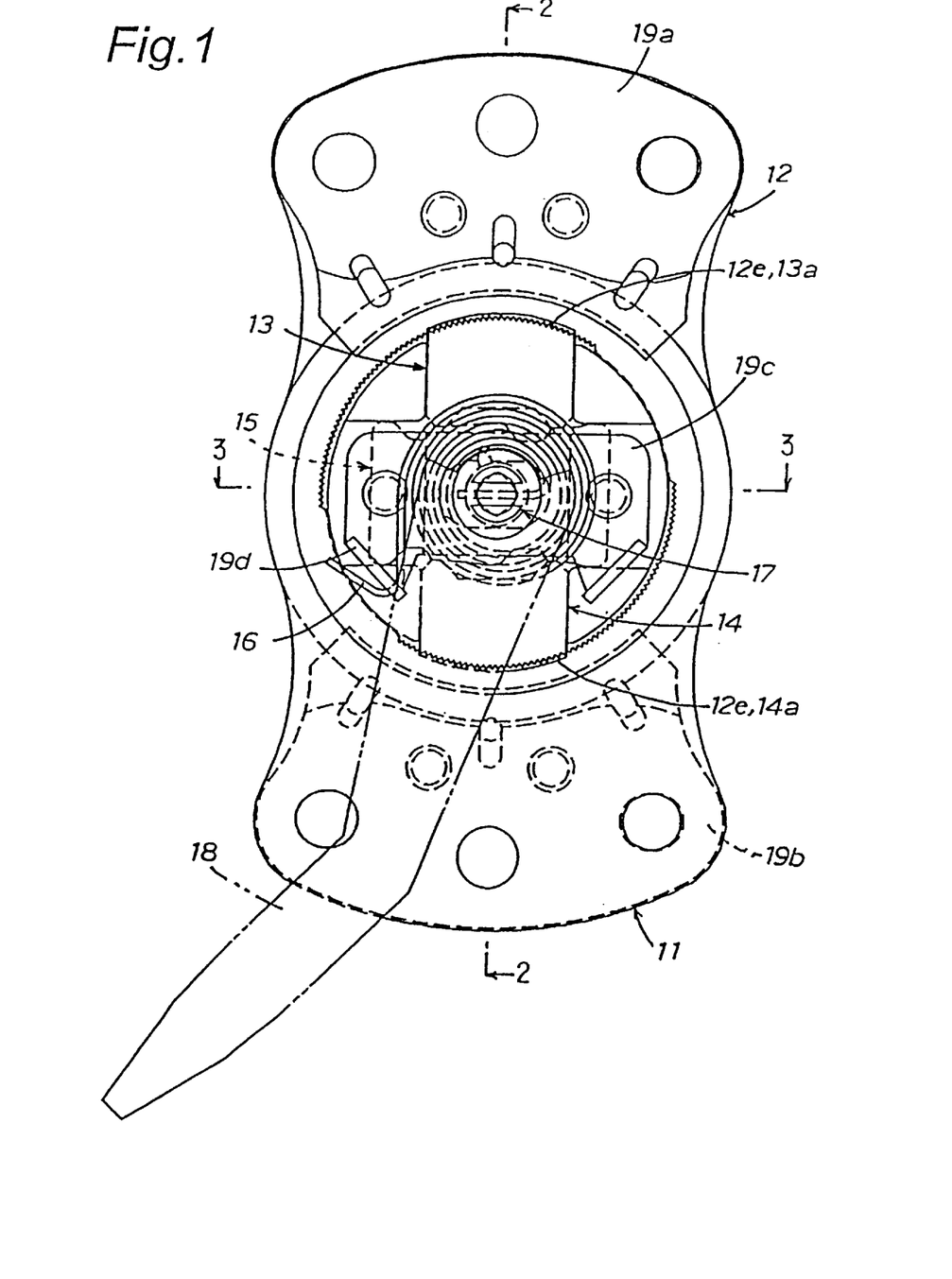
FIG. 1 is a partly broken front view of a reclining mechanism in accordance with the present invention.
Figure 2:
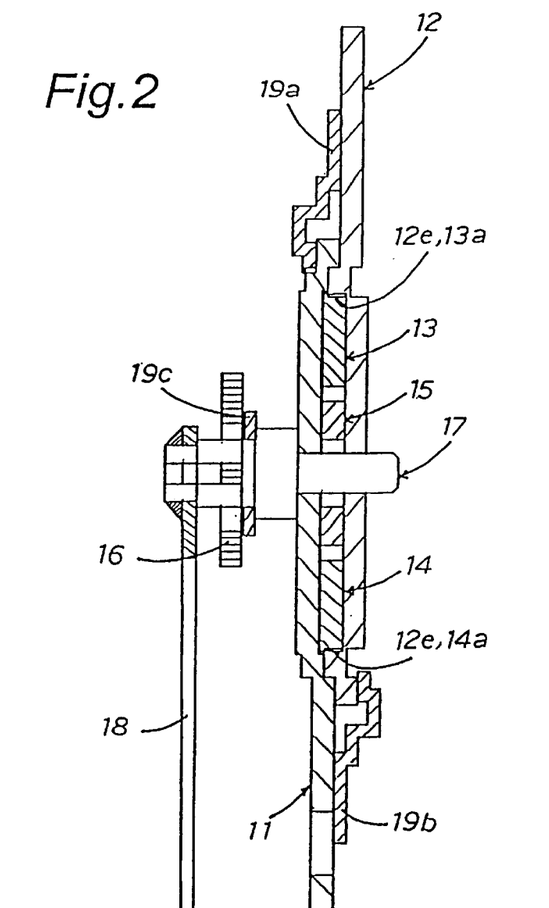
FIG. 2 is a vertical sectional view of the reclining mechanism taken along line 2—2 in FIG. 1.
Figure 3:
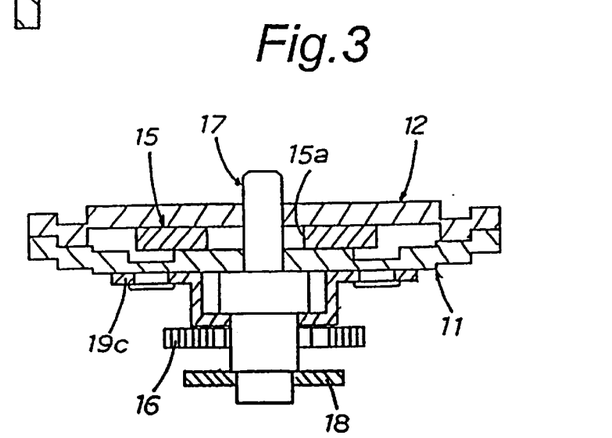
FIG. 3 is a cross-sectional view of the reclining mechanism taken along line 3—3 in FIG. 1.

Illustrated in FIGS. 1 to 3 is a reclining mechanism for a vehicle seat in accordance with the present invention, which reclining mechanism is composed of a first arm member 11 for attachment to a frame structure of a seat cushion (not shown) of the vehicle seat, a second arm member 12 for attachment to a frame structure of a back rest (not shown) of the vehicle seat, a pair of slide pawls 13 and 14, a cam element 15, a torsion spring 16, a hinge pin 17 and an operation lever 18. The first and second arm members 11 and 12 are coupled to contain the slide pawls 13, 14 and cam element 15 therein. The second arm member 12 is connected to the first arm member 11 by means of the hinge pin 17 for relative rotation about the hinge pin 17. The reclining mechanism is assembled with the vehicle seat in such a manner that the second arm member 12 is locked to the first arm member 11 at a selected position to retain the back rest at an inclined angle and that the second arm member is released from the first arm member to permit adjustment of the inclined angle of the back rest.

Figure 4:
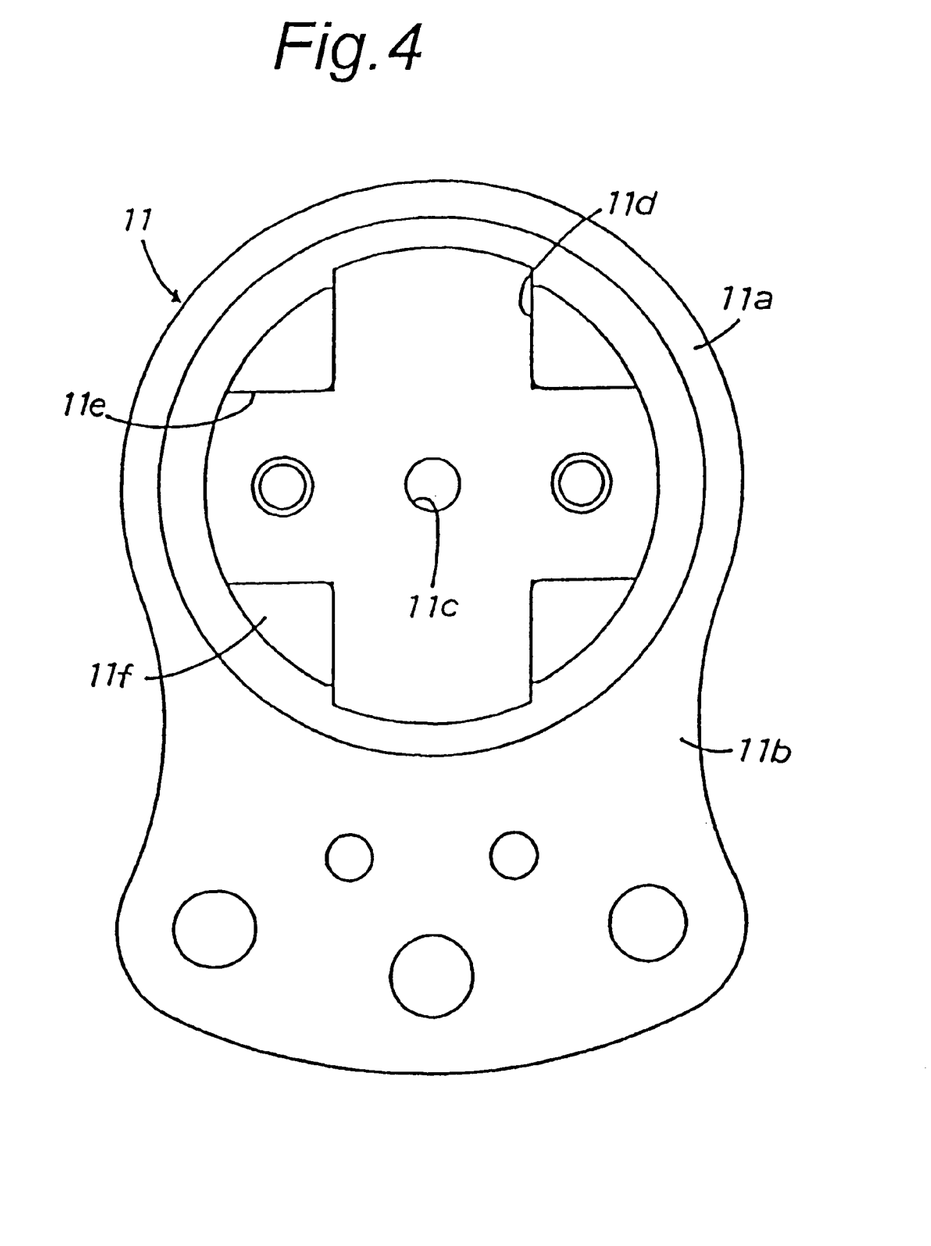
FIG. 4 is a front view of a first arm member shown in FIG. 1.
Figure 5:
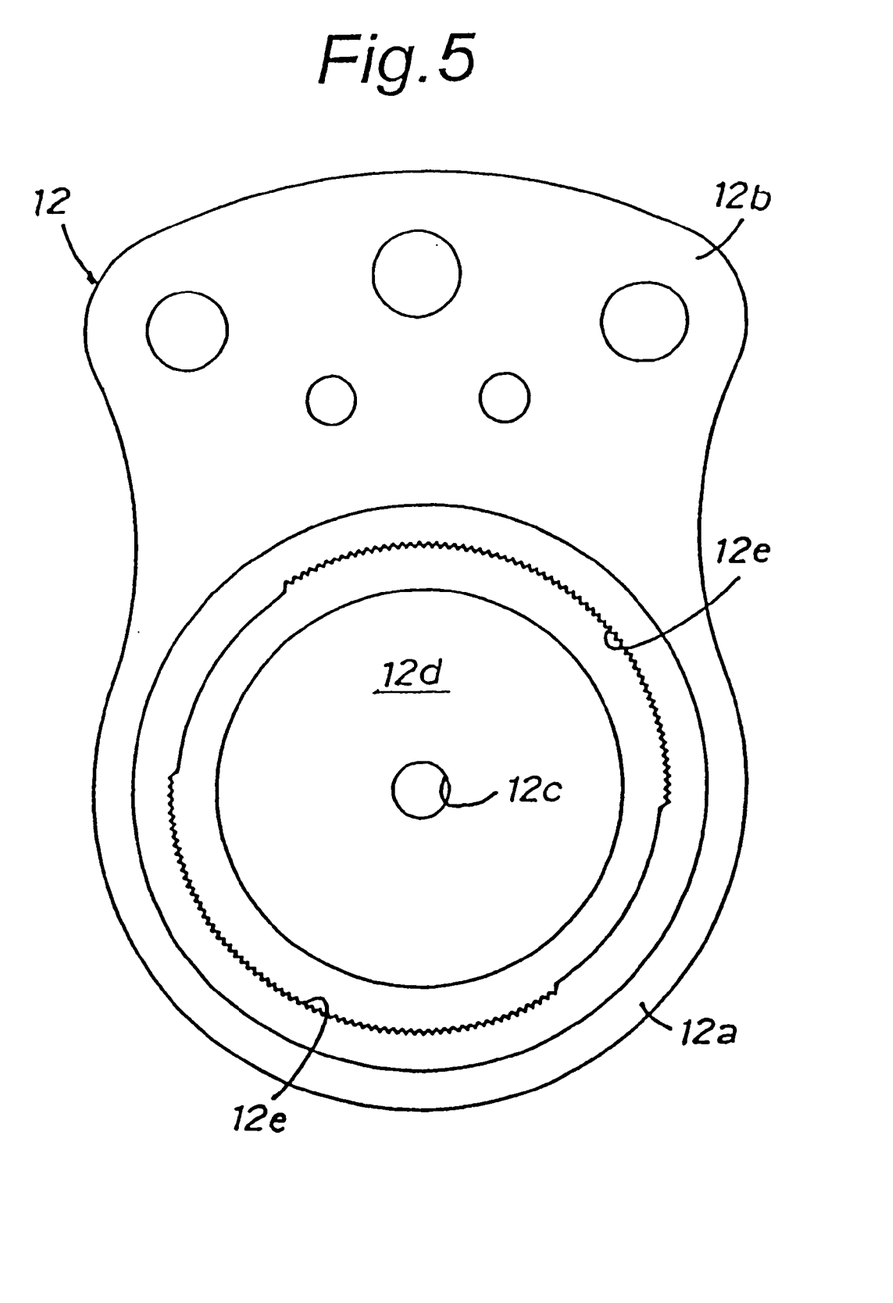
FIG. 5 is a front view of a second arm member shown in FIG. 1.

As shown in FIGS. 1 to 4, the first arm member 11 has an upper portion 11a formed to contain the slide pawls 13, 14 and cam element 15 and a lower portion 11b for attachment to the frame structure of the seat cushion. As shown in FIG. 4, the upper portion 11a of first arm member 11 is formed therein with a vertical guide groove 11d across a central hole 11c and a lateral guide groove 11e perpendicular to the vertical groove 11d. The vertical guide groove 11d is slightly extended outward from the inner periphery of a circular recess 11f formed in the upper portion 11a, while the lateral groove 11e is extended to the inner periphery of the circular recess 11f.

As shown in FIGS. 1 to 3 and 5, the second arm member 12 has a lower portion 12a formed to contain the slide pawls 13, 14 and cam element 15 and an upper portion 12b for attachment to the frame structure of the back rest. The lower portion 12a of second arm member 12 is formed with a circular recess 12d concentric with a central hole 12c. The circular recess 12d and central hole 12c are formed in the lower portion 12a of second arm member 12 to correspond with the circular recess 11f and central hole 11c formed in the upper portion 11a of first arm member 11. The circular recess 12d of second arm member 12 is formed at its inner periphery with a pair of diametrically opposed semi-circular ratchet portions 12e.

Figure 6:
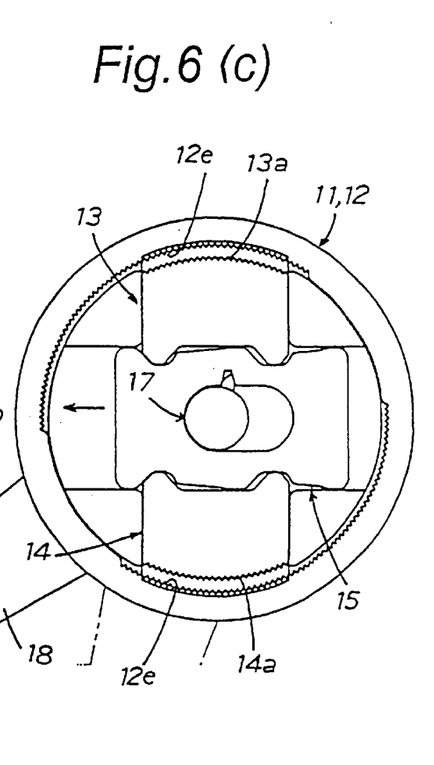
FIGS. 6(a) to 6(c) illustrate a mode of operation of a cam element in the reclining mechanism shown in FIG. 1.
Figure 7:
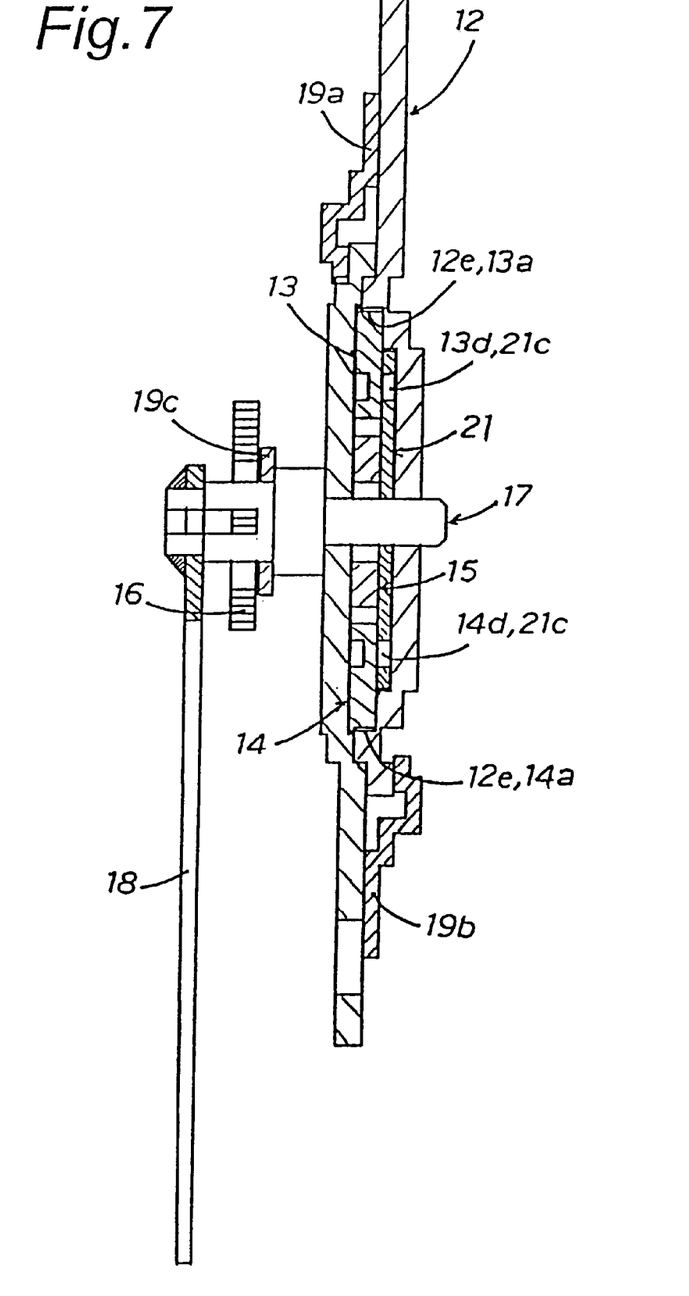
FIG. 7 is a vertical sectional view of a first modification of the reclining mechanism shown in FIGS. 1 to 3.

The slide pawls 13 and 14 are formed in the same width and thickness. As shown in FIG. 6, the slide pawls 13 and 14 are formed at their outer ends with semi-circular toothed portions 13a and 14a and at their inner ends with flat surfaces 13b and 14b and each pair of tapered projections 13c and 14c. The thickness of each of the slide pawls 13, 14 is determined to correspond with a space defined by the vertical guide groove 11d of first arm member 11 and the circular recess 12d of second arm member 12, and the width of each of the slide pawls 13, 14 is determined to correspond with the width of the vertical guide groove 11d of first arm member 11. The semi-circular toothed-portions 13a, 14a of slide pawls 13, 14 are positioned to be engaged with and disengaged from the ratchet portions 12e of second arm member 12. The tapered projections 13c, 14c of slide pawls 13, 14 are formed to be located in the lateral guide groove lie of first arm member 11 in a condition where the slide pawls 13, 14 are maintained in engagement with the ratchet portions 12e of second arm member 12.

As shown in FIGS. 6(a)–6(c), the cam element 15 is in the form of a rectangular plate which is formed at its central portion with an elongated lateral hole 15a and at its opposite flat surfaces with each pair of laterally spaced recesses 15b, 15c. The lateral hole 15a is formed at one side thereof with a radial recess 15d. The thickness of the cam element 15 is determined to correspond with a space defined by the lateral guide groove 11e of first arm member 11 and the circular recess 12d of second arm member 12. The width of cam element 15 is determined to correspond with the width of lateral groove 11e of first arm member 11, and the elongated lateral hole. 15a of cam element 15 is formed to allow rotation and lateral movement of cam element 15 relative to the hinge pin 17. The laterally spaced recesses 15b, 15c of cam element 15 each are formed to be brought into engagement with and disengaged from the laterally spaced projections 13c, 14c of slide pawls 13, 14. The radial recess 15d of cam element 15 is maintained in engagement with a radial projection 17a of hinge pin 17.

During the assembly process of the reclining mechanism, the slide pawls 13, 14 are slidably engaged with the vertical guide groove 11d of first arm member 11, and the cam element 15 is slidably engaged with the lateral guide groove 11e of first arm member 11 and disposed between the slide pawls 13 and 14. Thereafter, the second arm member 12 is coupled at its lower portion 12a with the upper portion 11a of first arm member 11 for relative rotation and united with the first arm member 11 by engagement with upper and lower retainer plates 19a and 19b welded to the upper and lower portions 12a and 11a of second and first arm members 12 and 11. The retainer plate 19a is slidably engaged at its lower end portion with a semicircular upper end of first arm member 11, while the retainer plate 19b is slidably engaged at its upper end portion with a semicircular lower end of second arm member 12. When the second arm member 12 has been coupled at its lower portion 12a with the upper portion 11a of first arm member 11 as shown in FIGS. 1 and 2, the slide pawls 13, 14 and cam element 15 are contained in the circular recess 12d of second arm member 12. In such a condition, the hinge pin 17 is inserted into the central hole 12c of second arm member 12 across the central hole 11c of first arm member 11 and the elongated lateral hole 15a of cam element 15. In this instance, the radial projection 17a of hinge pin 17 is engaged with the recess 15d of cam element 15.

As shown in FIG. 3, a support plate 19c is riveted to the upper portion 11a of first arm member 11 and engaged with a stepped portion of hinge pin 17 to retain the hinge pin 17 in position. As shown in FIG. 1, the support plate 19c is formed with a pair of hooks 19d. The torsion spring 16 is engaged at its inner end with an outer end portion of hinge pin 17 and at its other end with one of the hooks 19d to bias the hinge pin 17 in a counterclockwise direction so that the cam element 15 is retained at a central portion of lateral guide groove 11e as shown in FIG. 6(a). The operation lever 18 is fixed to the outer end of hinge pin 17.

In a condition where the cam element 15 is retained at the central portion of lateral guide groove 11e under the load of torsion spring 16 as shown in FIG. 6(a), the tapered projections 13c, 14c of slide pawls 13, 14 are maintained in engagement with the opposite flat surfaces of cam element 15 such that the slide pawls 13 and 14 are maintained in engagement with the semi-circular ratchet portions 12e of second arm member 12 to restrict relative rotation of the second arm member 12 with respect to the first arm member 11. Thus, the back rest of the vehicle seat is retained at an inclined angle. When the operation level 18 is operated to rotate the hinge pin 17 against the load of torsion spring 16 in a clockwise direction, the cam element 15 is moved rightward as shown by an arrow in FIG. 6(a). The rightward movement of cam element 15 is restricted by abutment of the cam element 15 against the hinge pin 17 at the left-hand end of lateral hole 15a. As a result, the tapered projections 13c, 14c of slide pawls 13, 14 are brought into engagement with the recesses 15b, 15c of cam element 15 to disengage the slide pawls 13, 14 from the ratchet portions 12e of second arm member 12 as shown in FIG. 6(c). While the operation lever 18 is retained in its operated position, the slide pawls 13, 14 are retained in their disengaged positions from the ratchet portions 12e of second arm member 12 to permit adjustment of the inclined angle of the back rest.

When the operation lever 18 is released after adjustment of the back rest, the hinge pin 17 is rotated under the load of torsion spring 16 in the counterclockwise direction to move the cam element 15 leftward as shown by an arrow in FIG. 6(c). During leftward movement of the cam element 15, the tapered projections 13c, 14c of slide pawls 13, 14 are disengaged from the recesses 15b, 15c of cam element 15 and brought into engagement with the opposite flat surfaces of cam element 15 to engage the slide pawls 13, 14 with the ratchet portions 12e of second arm member 12 and to maintain the slide pawls 13, 14 in engagement with the ratchet portions 12e of second arm member 12. In such a condition, each pair of spaced projections 13c, 14c of slide pawls 13, 14 engaged with the opposite flat surfaces of cam element 15 is useful to firmly maintain the slide pawls 13, 14 in engagement with the ratchet portions 12e of second arm member 12 even if the reclining mechanism is applied with a load. As in the reclining mechanism the hinge pin 17 is assembled across the elongated lateral hole 15a of-cam element 15 and engaged, at its radial projection 17a with the recess 15d of the elongated lateral hole 15a, the lateral movement of cam element 15 is smoothly effected by rotation of the hinge pin 17.

Figure 8A:
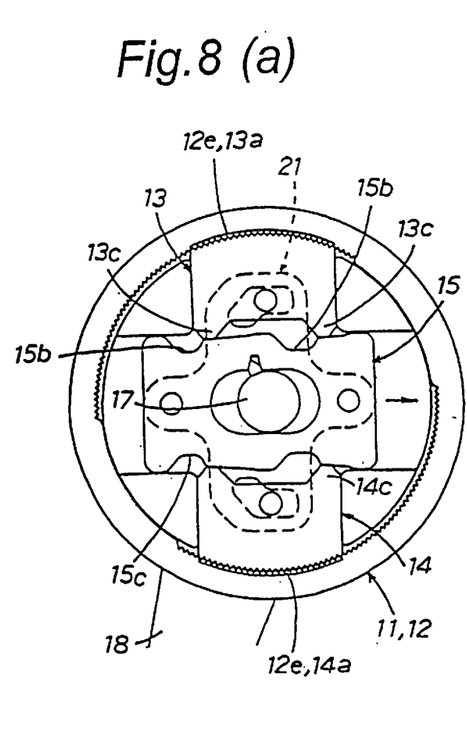
FIGS. 8(a) to 8(c) illustrate a mode of operation of a cam element in the first modification.
Figure 8B:
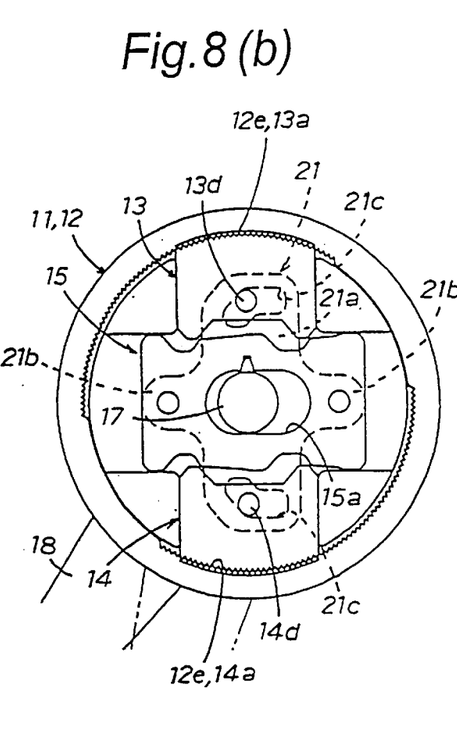
Figure 8C:
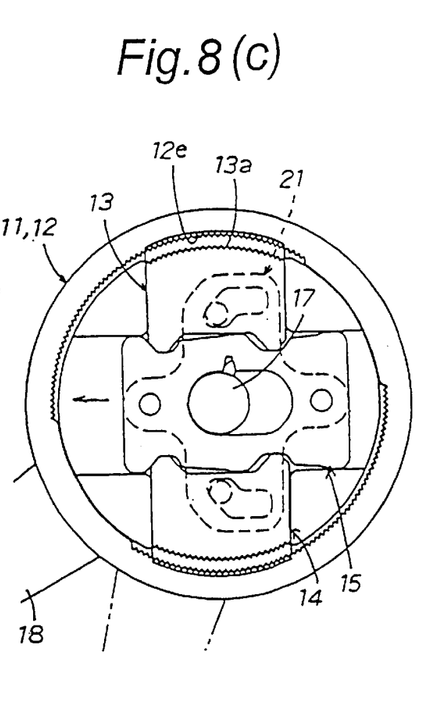

Illustrated in FIGS. 7 and 8(a)–8(c) is a first modification of the reclining mechanism shown in FIGS. 1 to 3. In this modification, a cam plate 21 is assembled with the cam element 15 to move the slide pawls 13, 14 toward and away from the ratchet portions 12e of second arm member 12 in accordance with lateral movement of the cam element 15. As shown in FIG. 8(b), the cam plate 21 is in the form of a rectangular plate 21a formed at its opposite sides with a pair of arm portions 21b and formed with a pair of vertically spaced cam slots 21c. The cam plate 21 is fixed to the cam element 15 at its both arm portions 21b for movement therewith. The cam slots 21c each are formed with an inclined portion and a horizontal portion. The slide pawls 13, 14 are provided thereon with cam pins 13d, 14d which are slidably engaged with the cam slots 21c of cam plate 21.

In a condition where the spaced projections 13c, 14c of slide pawls 13, 14 are maintained in engagement with the opposite flat surfaces of cam element 15 as shown in FIG. 8(a), the slide pawls 13, 14 are maintained in engagement with the ratchet portions 12e of second arm member 12, and the cam pins 13d, 14d are located in the horizontal portions of cam slots 21c. When the operation level 18 is operated by the user to move the cam element 15 rightward as shown by an arrow in FIG. 8(a), the spaced projections 13c, 14c of slide pawls 13, 14 are brought into engagement with the recesses 15b, 15c of cam element 15, and the cam plate 21 is moved rightward with the cam element 15. As a result, the cam pins 13d, 14d are moved toward the cam element 15 by engagement with the inclined portions of cam slots 21c to disengage the slide pawls 13, 14 from the ratchet portions 12e of second arm member 12. When the operation lever 18 is released to move the cam element 15 leftward under the load of torsion spring 16 as shown by an arrow in FIG. 8(c), the spaced projections 13c, 14c of slide pawls 13, 14 are disengaged from the recesses 15b, 15c of cam element 15 and brought into engagement with the opposite flat surfaces of cam element 15 to engage the slide pawls 13, 14 with the ratchet portions 12e of second arm member 12, while the cam plate 21 is moved leftward with the cam element 15, so that the cam pins 13d, 14d are located in the horizontal portions of cam slots 21c.

Figure 9A:
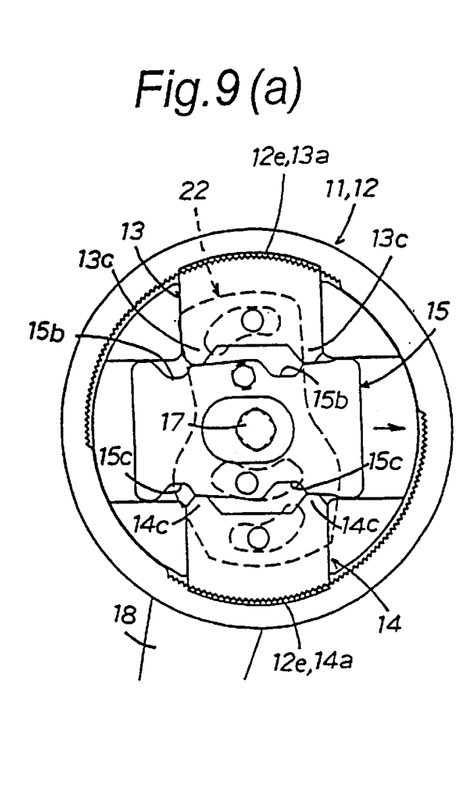
FIGS. 9(a) to 9(c) illustrate a mode of operation of a cam element in a second modification of the reclining mechanism shown in FIGS. 1 to 3.
Figure 9B:
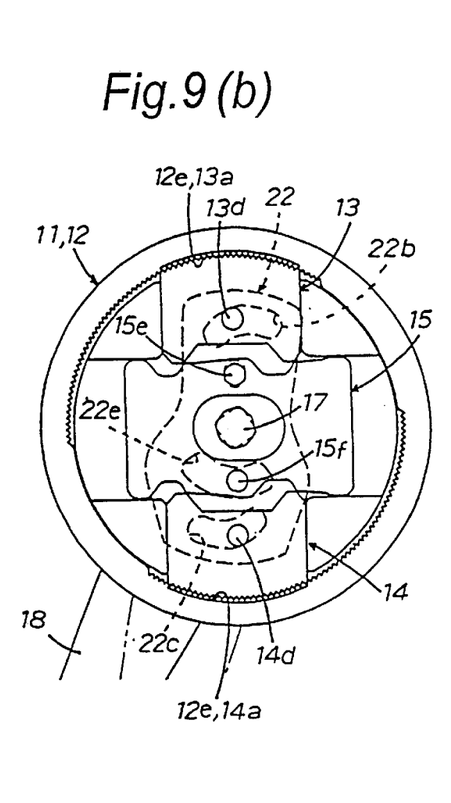
Figure 9C:
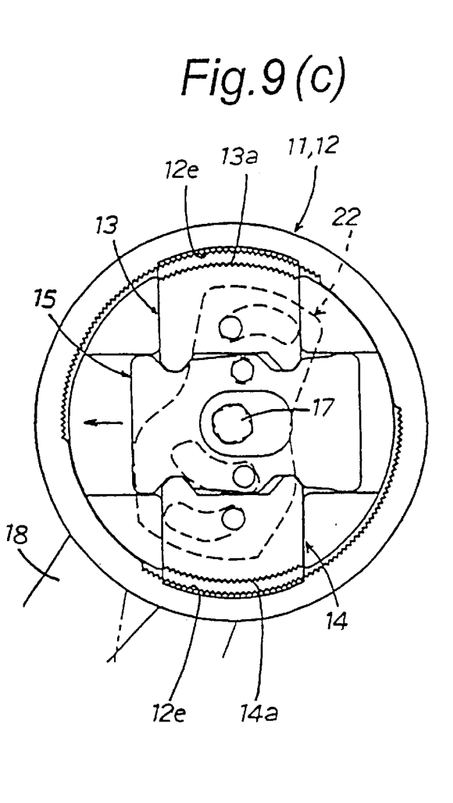
Figure 10A:
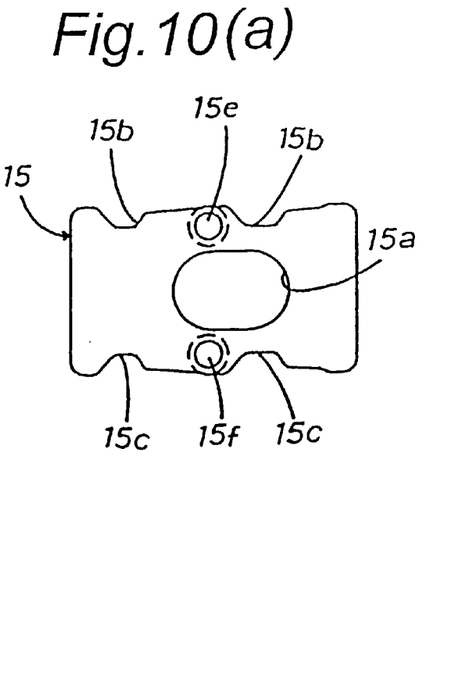
FIG. 10(a) is a front view of the cam element shown in FIGS. 9(a) to 9(c)
Figure 10B:
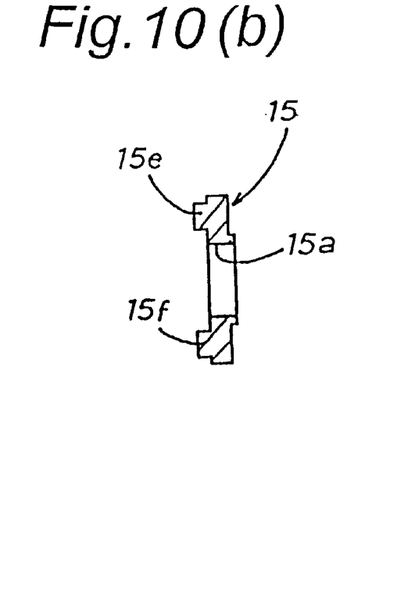
FIG. 10(b) is a vertical sectional view of the cam element shown in FIG. 10(a)
Figure 11A:
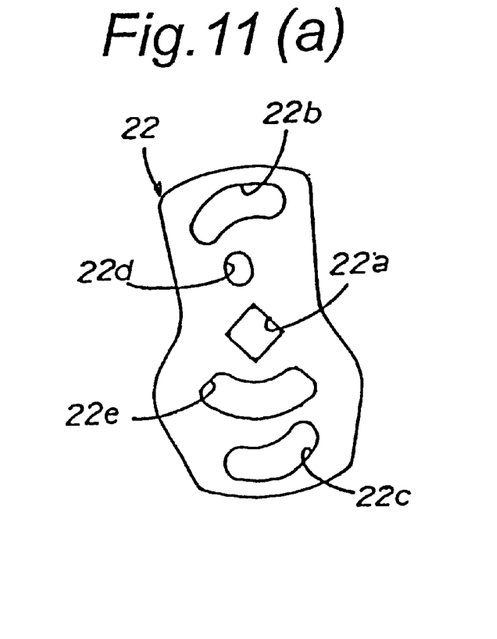
FIG. 11(a) is a front view of a movable cam plate shown in FIGS. 9(a) to 9(c)
Figure 11B:
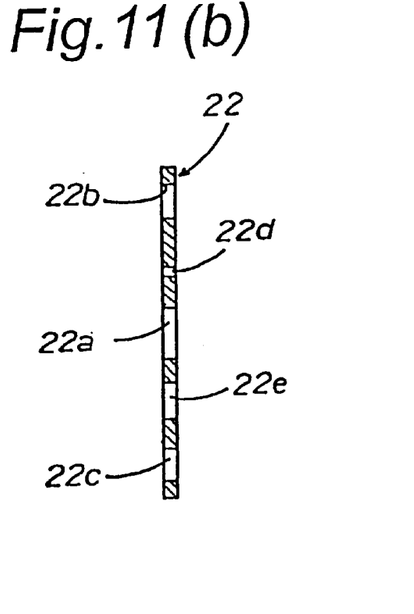
FIG. 11(b) is a vertical sectional view of the movable cam plate shown in FIG. 11(a)

Illustrated in FIGS. 9(a)–9(c) is a second modification of the reclining mechanism shown FIGS. 1 to 3. In this modification, a movable cam plate 22 is assembled with the cam element 15 to move the slide pawls 13, 14 toward and away from the the ratchet portions 12e of second arm member 12 in accordance with lateral movement of the cam element 15. As shown in FIGS. 10(a) and 10(b), the cam element 15 is provided thereon with a pair of diametrically opposed support pins 15e, 15f for engagement with the cam plate 22. As shown in FIGS. 11(a) and 11(b), the cam plate 22 is formed at its central portion with a square hole 22a and formed with a pair of diametrically opposed semi-circular cam slots 22b and 22c. The cam plate 22 is further formed with a circular hole 22d for engagement with the support pin 15e of cam element 15 and a semi-circular elongated hole 22e which is slidably coupled with the support pin 15f of cam element 15 to permit rotation of the cam plate 22 relative to the cam plate 15. The cam plate 22 is assembled with the hinge pin 17 at its square hole 22a for rotation therewith and coupled with the support pins 15e, 15f of cam element 15 at its circular hole 22d and semi-circular elongated hole 22e. As shown in FIG. 9(b), the slide pawls 13, 14 are provided thereon with cam pins 13d, 14d which are slidably engaged with the cam slots 22b, 22c of cam plate 22.

In the reclining mechanism, the cam plate 22 is rotated with the hinge pin 17 to cause lateral movement of the cam element 15 in a direction perpendicular to the slide pawls 13 and 14. In a condition where the spaced projections 13c, 14c of slide pawls 13, 14 are maintained in engagement with the opposite flat surfaces of cam element 15 as shown in FIG. 9(a), the slide pawls 13, 14a are maintained in engagement with the ratchet portions 12e of second arm member 12. When the operation lever 18 is operated by the user against the load of torsion spring 16 to rotate the cam plate 22 in a clockwise direction, the cam element 15 is moved rightward by thrust force applied at its support pin 15e from the cam plate 22 as shown by an arrow in FIG. 9(a), while the spaced projections 13c, 14c of slide pawls 13, 14 are brought into engagement with the recesses 15b, 15c of cam element 15. As a result, the cam pins 13d, 14d of slide pawls 13, 14 are moved toward the cam element 15 by engagement with the cam slots 22b, 22c of cam plate 22 to disengage the slide pawls 13, 14 from the ratchet portions 12e of second arm member 12. When the operation lever 18 is released to rotate the hinge pin 17 under the load of torsion spring 36 in the counterclockwise direction, the cam plate 22 is rotated with the hinge pin 17 to move the cam element 15 leftward as shown an arrow in FIG. 9(c). As a result, the spaced projections 13c, 14c of slide pawls 13, 14 are disengaged from the recesses 15b, 15c of cam element 15 and brought into engagement with the opposite flat surfaces of cam element 15 to engage the slide pawls 13, 14 with the ratchet portions 12e of second arm member 12.

Figure 12A:
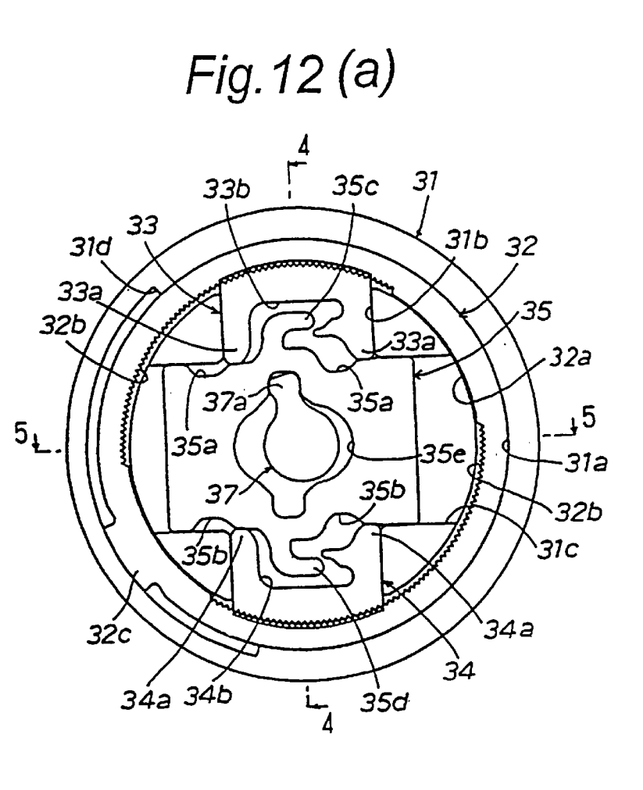
FIGS. 12(a) and 12(b) illustrate a mode of operation of a cam element in a third modification of the reclining mechanism.
Figure 12B:
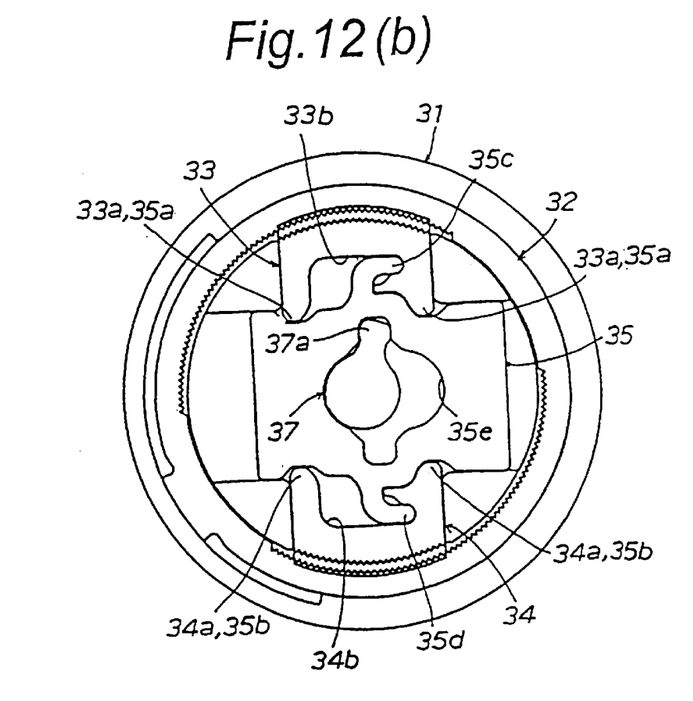
Figure 14:
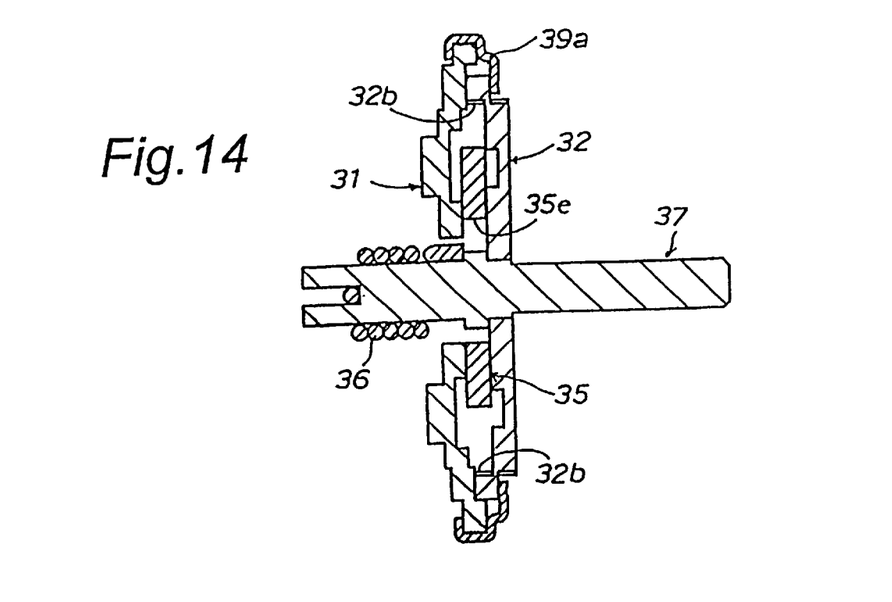
FIG. 14 is a cross-sectional view of the reclining mechanism taken along line 5—5 in FIG. 12(a)

Illustrated in FIGS. 12(a)–12(b) and 14 is a third modification of the reclining mechanism shown in FIGS. 1 to 3, wherein the first arm member 11 is replaced with a first disk member 31 for attachment to the frame structure of the seat cushion and a second disk member 32 for attachment to the frame structure of the back rest. The first disk member 31 has a circular recess 31a and vertical and lateral guide grooves 31b, 31c formed in the circular recess 31a. The second disk member 32 has a circular recess 32a formed at its inner periphery with a pair of diametrically opposed ratchet portions 32b.

Figure 13:
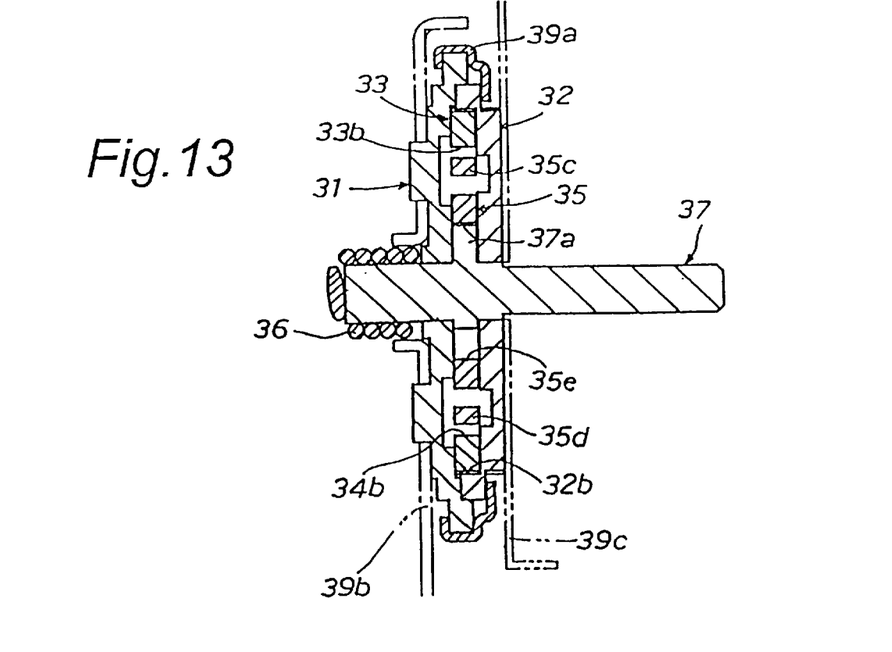
FIG. 13 is a vertical sectional view of the reclining mechanism taken along line 4—4 in FIG. 12(a)

The second disk member 32 is coupled within the circular recess 31a of first disk member 31 for relative rotation in such a manner that a radial projection 32c of second disk member 32 is located in a semi-circular recess 31d formed in the inner periphery of circular recess 31a of first disk member 31. The radial projection 32c of second disk member 32 is provided to restrict rotation of the second disk member 32 relative to the first disk member 31 by engagement with a stepped end of the semi-circular recess 31d. As shown in FIG. 13, the first and second disk members 31 and 32 are united with each other by means of an annular bracket 39a coupled therewith. The slide pawls 13, 14 and cam element 15 in the reclining mechanism shown in FIGS. 1 to 3 are replaced with slide pawls 33, 34 and cam element 35 which are contained in a space defined by the circular recesses 31a and 32a of disk members 31 and 32. The slide pawls 33, 34 are slidably coupled within the vertical guide groove 31b of first disk member 31, while the cam element 35 is slidably coupled within the lateral guide groove 31c and interposed between the slide pawls 33 and 34.

The slide pawl 33 is formed at its outer end with a semi-circular toothed portion and at its inner end with a pair of tapered projections 33a and a recessed portion 33b between the tapered projections 33a. Similarly, the slide pawl 34 is formed at its outer end with a semi-circular toothed portion and at its inner end with a pair of tapered projections 34a and a recessed portion 34b between the tapered projections 34a. The cam element 35 is formed at its opposite flat surfaces with each pair of laterally spaced recesses 35a, 35b and a pair of radially spaced projections 35c, 35d each of which is located between the recesses 35a and between the recesses 35b. In a condition where the slide pawls 33, 34 are engaged with the opposite flat surfaces of cam element 35 at their tapered projections 33a, 34a and maintained in engagement with the ratchet portions 32b of second disk member 32 as shown in FIG. 12(a), the radial projections 35c, 35d of cam element 35 are disengaged from the recesses 33b, 34b of slide pawls 33, 34. When the cam element 35 is moved rightward, the radial projections 35c, 35d of cam element 35 are brought into engagement with the recesses 33b, 34b of slide pawls 33, 34 as shown in FIG. 12(b) to disengage the slide pawls 33, 34 from the ratchet portions 32b of second disk member 32.

For connection of a hinge pin 37 with the cam element 35, a hinge pin 37 is integrally formed with a connecting arm 37a which is located in an aperture 35e formed in the cam element 35 and engaged with an inner periphery of the aperture 35e. As shown in FIGS. 13 and 34, the hinge pin 37 is assembled with the disk members 31, 32 in such a manner as to permit rotation of the second disk member 32 relative to the first disk member 31 and loaded by a torsion spring 36 in a counterclockwise direction. When the hinge pin 37 is rotated by an operation level (not shown) against the load of torsion spring 36 in a clockwise direction, the cam element 35 is moved rightward by engagement with the connecting arm 37a of hinge pin 37. When the operation level is released to rotate the hinge pin 37 in the counterclockwise direction under the load of torsion spring 36, the cam element 35 is moved leftward by engagement with the connecting arm 37a of hinge pin 37. In FIG. 13, the reference numeral 39b designates the frame structure of the seat cushion, and the reference numeral 39c designates the from structure of the back rest.

In a condition where the spaced projections 33a, 34a are maintained in engagement with the opposite flat surfaces of cam element 35, the slide pawls 33, 34 are maintained in engagement with the ratchet portions 32b of second disk member 32 to retain the back reset at an adjusted angle. When the operation lever is operated to rotate the hinge pin 37 against the load of torsion spring 36 in the clockwise direction, the cam element 35 is moved rightward by engagement with the connecting arm 37a of hinge pin 37, while the spaced projections 33a, 34a of slide pawls 33, 34 are brought into engagement with the spaced recesses 35a, 35b of cam element 35. During rightward movement of the cam element 35, the slide pawls 33, 34 are moved toward the cam element 35 by engagement with the projections 35c, 35d of cam element 35 at their recessed portions 33b, 34b and disengaged from the ratchet portions 32b of second disk member 32. When the operation level is released to rotate the hinge pin 37 in the counterclockwise direction under the load of torsion spring 36, the cam element 35 is moved leftward by engagement with the connecting arm 37a of hinge pin 37, and the spaced projections 33a, 34a of slide pawls 33, 34 are disengaged from the recesses 35a, 35b of cam element 35 and brought into engagement with the opposite flat surfaces of cam element 35 to engage the slide pawls 33, 34 with the ratchet portions 32b of second disk member 32.

As in the reclining mechanism, the radial projection 32c of second disk member 32 is provided to restrict relative rotation of the second disk member 32 to the first disk member 31 by engagement therewith, the adjustment of the inclined angle of the back rest can be restricted in a predetermined extent in a simple construction.

Figure 15:
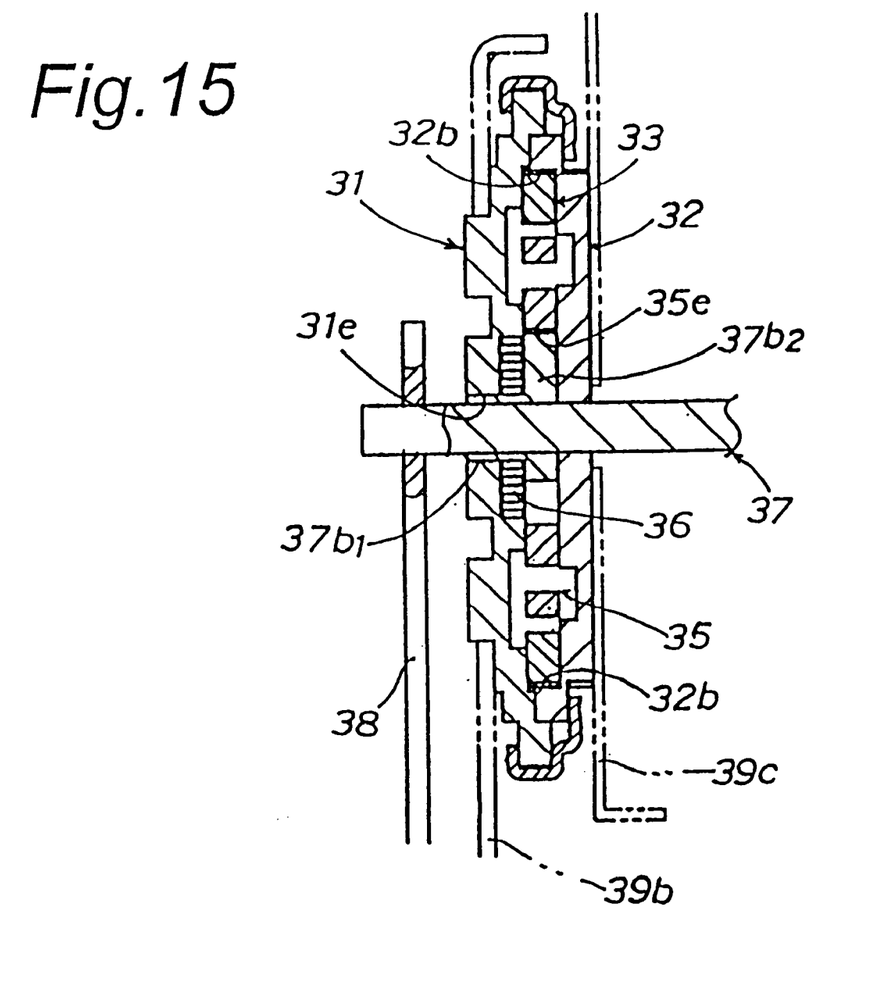
FIG. 15 is a vertical sectional view of a modification of the reclining mechanism shown in FIG. 13.

Illustrated in FIG. 15 is a modification of the reclining mechanism shown in FIGS. 1 to 3. The modified reclining mechanism is composed of the same component parts as the disk members 31, 32, slide pawls 33, 34 and cam element 35 in the reclining mechanism shown in FIGS. 13 and 14. In this modification, the hinge pin 37 is in the form of a longitudinal connecting rod, and the connecting arm 37a of cam element 37 is replaced with an arm portion 37b2 which is integrally formed with a sleeve 37b1 splined to the connecting rod 37 for rotation therewith. The arm portion 37b2 of sleeve 37b1 is engaged with the inner periphery of aperture 35e of cam element 35 as shown in FIG. 12(a). The torsion spring 36 is disposed between the first disk member 31 and the arm portion 37b2 of sleeve 37b1 and assembled with the sleeve 37b1 to bias the connecting rod 37 in a counterclockwise direction. The connecting rod 37 can be adapted to operatively connect a pair of laterally spaced reclining mechanisms (not shown) mounted to opposite sides of a vehicle seat in a simple construction.

What is claimed is:

1. A reclining mechanism for a vehicle seat, comprising:
   a first disk member for attachment to a frame structure of a seat cushion or a back rest of the vehicle seat, the first disc member having a circular recess concentrically formed therewith;
   a second disk member for attachment to a frame structure of the other of the back rest or the seat cushion, the second disk member having a circular recess concentrically formed therewith and an internal semi-circular ratchet portion formed on an inner periphery of its circular recess and being coupled at its circular recess with the circular recess of the first disk member for relative rotation,
   a hinge pin assembled with the disk members in such a manner as to permit relative rotation of the disk members about the hinge pin;
   a slide pawl slidably coupled within a first guide groove formed in the circular recess of the first disk member in a radial direction with respect to the hinge pin to be moved toward and away from the ratchet portion of the second disk member;
   a cam element slidably coupled within a second guide groove formed in the circular recess of the first disk member in a lateral direction perpendicular to the first guide groove and engaged with an arm portion of the hinge pin to be moved by rotation of the hinge pin for engaging the slide pawl with the ratchet portion of the second disk member and for disengaging the slide pawl from the ratchet portion of the second disk member; and
   resilient means assembled with the hinge pin to bias the cam element in the lateral direction for maintaining the slide pawl in engagement with the ratchet portion of the second disk member.

2. A reclining mechanism for a vehicle seat as claimed in claim 1, wherein the cam element is in the form of a slide cam element slidably coupled within the second guide groove and engaged with the arm portion of the hinge pin to be moved in the lateral direction.

3. A reclining mechanism for a vehicle seat as claimed in claim 1, wherein the resilient means is disposed between the first disk member and the cam element to bias the cam element in the lateral direction.

4. A reclining mechanism for a vehicle seat as claimed in claim 1, wherein the resilient means comprises a spiral torsion spring disposed between the first disk member and the cam element in a surrounding relation with the hinge pin to bias the hinge pin in a rotational direction.

5. A reclining mechanism for a vehicle seat, comprising:
   a first disk member for attachment to a frame structure of a seat cushion or a back rest of the vehicle;
   a second disk member for attachment to a frame structure of the other of the back rest or the seat cushion, the second disk member being coupled with the first disk member for relative rotation and united with the first disk member by means of an annular bracket coupled therewith and having an internal semi-circular ratchet portion concentric therewith;
   a hinge pin assembled with the disk members in such a manner as to permit relative rotation of the disk members about the hinge pin,
   a sleeve member splined to the hinge pin for rotation therewith and being integrally formed thereon with an arm portion;
   a slide pawl slidably coupled within the first disk member in a radial direction with respect to the hinge pin to be moved toward and away from the ratchet portion of the second disk member, and
   a cam element slidably coupled within the first disk member in a lateral direction perpendicular to the slide pawl and engaged with the arm portion of the sleeve member to be moved by rotation of the hinge pin in the lateral direction for engaging the slide pawl with the ratchet portion of the second disk member and for disengaging the slide pawl from the ratchet portion of the second disk member;

wherein the hinge pin is loaded by a torsion spring assembled thereon to bias the cam element in the lateral direction for maintaining the slide pawl in engagement with the ratchet portions of the second disk member.

6. A reclining mechanism as claimed in claim 5, wherein the arm portion of the sleeve member is engaged with an inner periphery of an aperture formed in the cam element for effecting movement of the cam element in the lateral direction.

7. A reclining, mechanism as claimed in claim 5, wherein the torsion spring is disposed between the first disk member and the cam element and assembled with the sleeve member to bias the hinge pin in a rotational direction.

8. A reclining mechanism for a vehicle seat as claimed in claim 5, wherein the torsion spring is assembled on the sleeve member.

9. A reclining mechanism for a vehicle seat, comprising:
a first disk member for attachment to a frame structure of a seat cushion or a back rest of the vehicle;
a second disk member for attachment to a frame structure of the other of the back rest or the seat cushion, the second disk member being coupled with the first disk member for relative rotation and united with the first disk member by means of an annular bracket coupled therewith and having a pair of diametrically opposed internal semi-circular ratchet portions concentric therewith;
a hinge pin assembled with the disk members in such a manner as to permit relative rotation of the disk members about the hinge pin;
a sleeve member splined to the hinge pin for rotation therewith and being integrally formed thereon with an arm portion;
a pair of diametrically opposed slide pawls slidably coupled within, the first disk member in a radial direction with respect to the hinge pin to be moved toward and away from the ratchet portions of the second disk member; and
a cam element slidably coupled within the first disk member in a lateral direction perpendicular to the slide pawls and disposed between the slide pawls, the cam element being engaged with the area portion of the sleeve member to be moved by rotation of the hinge pin in the lateral direction for engaging the slide pawls with the ratchet portions of the second disk member and for disengaging the slide pawls from the ratchet portions of the second disk member;
wherein the hinge pin is loaded by a torsion spring assembled thereon to bias the cam element in the lateral direction for maintaining the slide pawls in engagement with the ratchet portions of the second disk member.

10. A reclining mechanism as claimed in claim 9, wherein the arm portion of the sleeve member is engaged with an inner periphery of an aperture formed in the cam element for effecting movement of the cam element in the lateral direction.

11. A reclining mechanism as claimed in claim 9, wherein the torsion spring is disposed between the first disk member and the cam element and assembled with the sleeve member to bias the hinge pin in a rotational direction.

12. A reclining mechanism as claimed in claim 9, wherein the slide pawls each are formed at their outer ends with a semi-circular toothed portion for engagement with each ratchet portion of the second disk member and at their inner ends with a pair of laterally spaced projections to be engaged with opposite flat surfaces of the cam element for maintaining the slide pawls in engagement with the ratchet portions of the second disk member, and wherein the cam element is formed at the opposite flat surfaces thereof with a pair of laterally spaced recesses to be engaged with the spaced projections of the slide pawls for permitting disengagement of the slide pawls from the ratchet portions of the second disk member.

13. A reclining mechanism for a vehicle seat as claimed in claim 9, wherein the torsion spring is assembled on the sleeve member.

14. A reclining mechanism for a vehicle seat, comprising:
a first disk member for attachment to a frame structure of a seat cushion or a back rest of the vehicle seat;
a second disk member for attachment to a frame structure of the other of the back rest or the seat cushion, the second disk member being coupled with the first disk member for relative rotation and united with the first disk member by means of an annular bracket coupled therewith and having a semi-circular ratchet portion concentric therewith;
a hinge pin assembled with the disk members;
a slide pawl slidably coupled within the first disk member in a radial direction with respect to the hinge pin to be moved toward and away from the ratchet portion of the second disk member;
a cam element slidably coupled within the first disk member in a lateral direction perpendicular to the slide pawl and operatively connected with the hinge pin to be moved by rotation of the hinge pin in the lateral direction for engaging the slide pawl with the ratchet portion of the second disk member and for disengaging the slide pawl from the ratchet portion of the second disk member; and
resilient means assembled with the hinge pin to bias the cam element in the lateral direction for maintain the slide pawl in engagement with the ratchet portion of the second disk member.

15. A reclining mechanism as claimed in claim 14, wherein the first disk member is formed with a first guide groove in a radial direction with respect to the hinge pin and a second guide groove perpendicular to the first guide groove, and wherein the slide pawl is slidably coupled within the first guide groove while the cam element is slidably coupled within the second guide groove.

16. A reclining mechanism for a vehicle seat as claimed in claim 14, wherein the slide pawl is formed at its outer end with a semi-circular toothed portion to be engaged with the ratchet portion of the second disk member and its inner end with a pair of laterally spaced projections for engagement with an end surface of the cam element; and wherein the cam element is formed at the end surface thereof with a pair of laterally spaced recesses to be engaged with the spaced projections of the slide pawl for permitting disengagement of the slide pawl from the ratchet portion of the second disk member.

17. A reclining mechanism for a vehicle seat as claimed in claim 14, wherein a sleeve member is splined to the hinge pin, said sleeve member is formed at one end thereof with an arm portion, and wherein said resilient means is in the form of a torsion spring disposed between the first disk member and the arm portion of the sleeve member and assembled with the sleeve member to bias the cam element in the lateral direction for maintaining the slide pawls in engagement with the ratchet portion of the second disk member.

18. A reclining mechanists for a vehicle seat, comprising:

a first disk member for attachment to a frame structure of seat cushion or a back rest of the vehicle seat;

a second disk member for attachment to a frame structure of the other of the back test or the seat cushion, the second disk member being coupled with the first disk member for relative rotation and united with the first disk member by means of an annular bracket coupled therewith and having a semi-circular ratchet portion concentric therewith;

a hinge pin assembled with the disk members;

a pair of slide pawls slidably coupled within a first guide groove formed in the first disk member in a radial direction with respect to the hinge pin to be moved toward and away from the ratchet portion of the second disk member;

a cam element slidably coupled within a second guide groove formed in the first disk member perpendicular to the first guide groove and disposed between the slide pawls, the cam element being operatively connected with the hinge pin to be moved by rotation of the hinge pin in the second guide groove for engaging the slide pawls with the ratchet portion of the second disk member and for disengaging the slide pawls from the ratchet portion of the second disk member; and resilient means assembled with the hinge pin to bias the cam element in the second guide groove for maintaining the slide pawls in engagement with the ratchet portion of the second disk member.

19. A reclining mechanism for a vehicle seat as claimed in claim 18, wherein the slide pawls each are formed at their outer ends with a semi-circular toothed portion for engagement with each ratchet portion of the second disk member and at their inner ends with a pair of laterally spaced projections to be engaged with opposite end surfaces of the cam element for maintaining the slide pawls in engagement with the ratchet portion of the second disk member, and wherein the cam element is formed at the opposite end surfaces thereof with a pair of laterally spaced recesses to be engaged with the spaced projections of the slide pawls for permitting disengagement of the slide pawls from the ratchet portions of the second disk member.

20. A reclining mechanism for a vehicle seat as claimed in claim 19, wherein the slide pawls each are formed with a recessed portion between the spaced projections thereof, and wherein the cam element is formed with a pair of radial projections to be engaged with the recessed portions of the slide pawls for disengaging the slide pawls from the ratchet portion of the second disk member when the hinge pin is rotated against the load of said resilient means to cause lateral movement of the cam element.

21. A reclining mechanism for a vehicle seat as claimed in claim 18, wherein the cam element is formed with an elongated lateral hole in the lateral direction perpendicular to the slide pawls, and wherein the hinge pin is inserted across the lateral hole of the cam element and maintained in engagement with a portion of the lateral hole of the cam element.

22. A reclining mechanism for a vehicle seat as claimed in claim 18, wherein a sleeve member is splined to the hinge pin, said sleeve member being is formed with an arm portion, and wherein said resilient means is in the form of a torsion spring disposed between the first disk member and the arm portion of the sleeve member and assembled with the sleeve member to bias the cam element in the second guide groove for maintaining the side pawls in engagement with the ratchet portion of the second disk member.

23. A reclining mechanism for a vehicle seat as claimed in claim 18, wherein the pair of slide pawls are diametrically opposed to each other.

* * * * *